US012626510B2

(12) United States Patent
Dong et al.

(10) Patent No.: US 12,626,510 B2
(45) Date of Patent: May 12, 2026

(54) VIDEO DATA PROCESSING METHOD AND SYSTEM, AND RELEVANT ASSEMBLIES

(71) Applicant: INSPUR SUZHOU INTELLIGENT TECHNOLOGY CO., LTD., Suzhou (CN)

(72) Inventors: Gang Dong, Suzhou (CN); Yaqian Zhao, Suzhou (CN); Rengang Li, Suzhou (CN); Hongbin Yang, Suzhou (CN); Haiwei Liu, Suzhou (CN); Dongdong Jiang, Suzhou (CN)

(73) Assignee: INSPUR SUZHOU INTELLIGENT TECHNOLOGY CO., LTD., Suzhou (CN)

( * ) Notice: Subject to any disclaimer, the term of this patent is extended or adjusted under 35 U.S.C. 154(b) by 756 days.

(21) Appl. No.: 18/012,939

(22) PCT Filed: Apr. 26, 2021

(86) PCT No.: PCT/CN2021/089924
§ 371 (c)(1),
(2) Date: Dec. 25, 2022

(87) PCT Pub. No.: WO2022/062388
PCT Pub. Date: Mar. 31, 2022

(65) Prior Publication Data
US 2023/0267740 A1 Aug. 24, 2023

(30) Foreign Application Priority Data
Sep. 25, 2020 (CN) .......................... 202011026282.4

(51) Int. Cl.
*G06V 20/40* (2022.01)
*G06N 3/045* (2023.01)
(Continued)

(52) U.S. Cl.
CPC .......... *G06V 20/46* (2022.01); *G06V 10/7715* (2022.01); *G06V 10/94* (2022.01);
(Continued)

(58) Field of Classification Search
CPC ...... G06V 20/46; G06V 10/764; G06V 20/41; G06V 10/454; G06V 10/82; G06V 20/49;
(Continued)

(56) References Cited

U.S. PATENT DOCUMENTS

2017/0024632 A1* 1/2017 Johnson .............. G06F 18/2111
2019/0065903 A1 2/2019 Wang et al.

FOREIGN PATENT DOCUMENTS

| CN | 110785778 A | 2/2020 |
| CN | 111695672 A | 9/2020 |
| CN | 112016522 A | 12/2020 |

OTHER PUBLICATIONS

Ku et al., NPL ("Three Dimensional Systolic Array Architecture for Fast Matrix Multiplication" Published 1984 By IEEE Total 4 pages (Year: 1984).*

(Continued)

*Primary Examiner* — Quoc A Tran
(74) *Attorney, Agent, or Firm* — IPro, PLLC

(57) ABSTRACT

A video data processing method, including: obtaining three-dimensional feature data and three-dimensional weight data corresponding to video data; separately preprocessing the three-dimensional feature data and the three-dimensional weight data to obtain a feature value matrix and a weight value matrix; and inputting the feature value matrix and the weight value matrix into a plurality of three-dimensional systolic arrays for parallel computing to obtain a video data processing result. The present method can fully expand the degree of parallelism of computation and a four-dimensional systolic computation architecture is constructed by using (Continued)

Acquire three-dimensional feature data and three-dimensional weight data corresponding to video data — S101

Pre-process the three-dimensional feature data and the three-dimensional weight data, respectively, to obtain a feature value matrix and a weight value matrix — S102

Input the feature value matrix and the weight value matrix into a plurality of three-dimensional systolic arrays for parallel calculations to obtain a video data processing result — S103 multiple three-dimensional systolic arrays, so as to perform parallel computing on a three-dimensional feature value matrix and a three-dimensional weight value matrix, thereby shortening the computation time of three-dimensional convolution, and improving the video data processing efficiency.

16 Claims, 5 Drawing Sheets

(51) Int. Cl.

| | |
|---|---|
| *G06N 3/08* | (2023.01) |
| *G06T 17/00* | (2006.01) |
| *G06V 10/44* | (2022.01) |
| *G06V 10/77* | (2022.01) |
| *G06V 10/82* | (2022.01) |
| *G06V 10/94* | (2022.01) |

(52) U.S. Cl.
CPC ............. *G06V 20/41* (2022.01); *G06N 3/045* (2023.01); *G06N 3/08* (2013.01); *G06T 17/00* (2013.01); *G06V 10/454* (2022.01); *G06V 10/82* (2022.01); *G06V 20/40* (2022.01); *G06V 20/49* (2022.01)

(58) Field of Classification Search
CPC .... G06V 20/40; G06V 10/7715; G06V 10/94; G06N 3/045; G06N 3/08; G06T 17/00
See application file for complete search history.

(56) References Cited

OTHER PUBLICATIONS

Salim et al., NPL ("2D matrix multiplication on a 3D systolic array" Published by Microelectronics Journal (1996) Total 12 pages (Year: 1996).*
PCT/CN2021/089924 international search report.

* cited by examiner

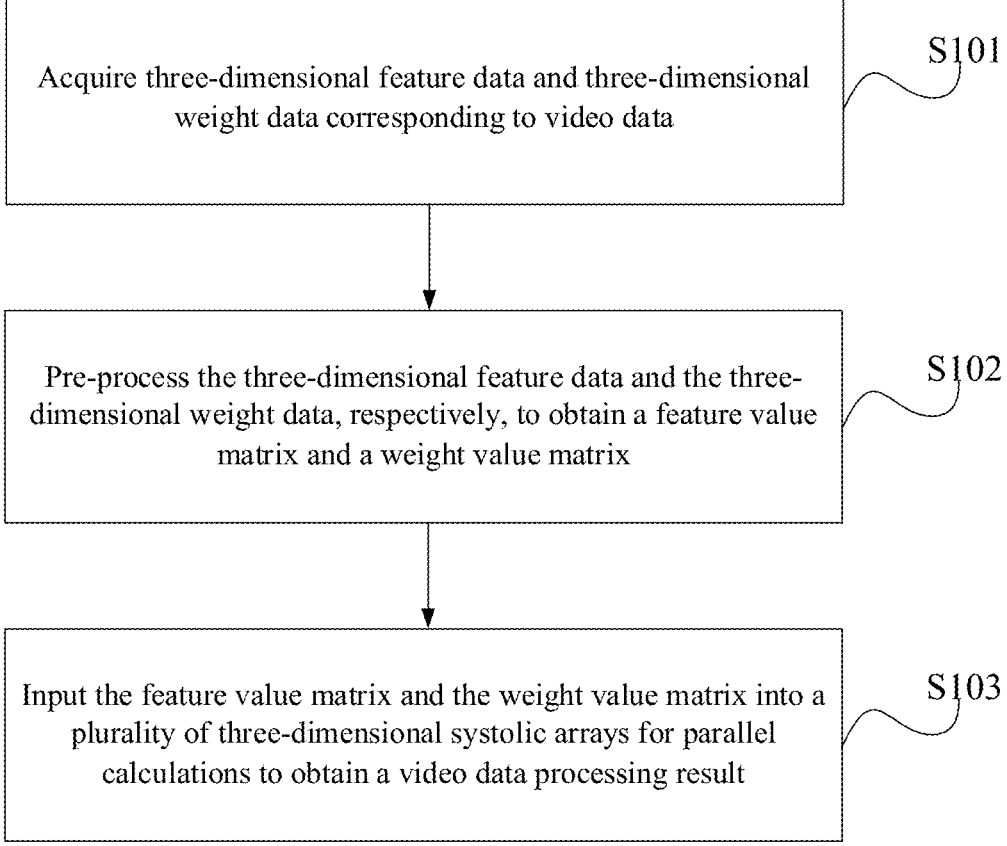

Acquire three-dimensional feature data and three-dimensional weight data corresponding to video data

S101

Pre-process the three-dimensional feature data and the three-dimensional weight data, respectively, to obtain a feature value matrix and a weight value matrix

S102

Input the feature value matrix and the weight value matrix into a plurality of three-dimensional systolic arrays for parallel calculations to obtain a video data processing result

| 1 | 2 | 3 |
|---|---|---|
| 4 | 5 | 6 |
| 7 | 8 | 9 |

| 10 | 11 | 12 |
|----|----|----|
| 13 | 14 | 15 |
| 16 | 17 | 18 |

| 1 | 2 | 3 | 4 | 5 | 6 | 7 | 8 | 9 |
|---|---|---|---|---|---|---|---|---|
| 18 | 17 | 16 | 15 | 14 | 13 | 12 | 11 | 10 |
| 19 | 20 | 21 | 22 | 23 | 24 | 25 | 26 | 27 |

| 19 | 20 | 21 |
|----|----|----|
| 22 | 23 | 24 |
| 25 | 26 | 27 |

Input channel 1
feature value

Input channel 2
feature value

Input channel 3
feature value

VIDEO DATA PROCESSING METHOD AND SYSTEM, AND RELEVANT ASSEMBLIES

CROSS-REFERENCE TO RELATED APPLICATION

The present disclosure claims the priority of the Chinese patent application filed on Sep. 25, 2020 before the CNIPA, China National Intellectual Property Administration with the application number of 202011026282.4 and the title of "VIDEO DATA PROCESSING METHOD, SYSTEM, AND RELATED COMPONENTS", which is incorporated herein in its entirety by reference.

FIELD

The present disclosure relates to the field of video data processing, and more particularly, to a video data processing method, system, and related components.

BACKGROUND

Video feature extraction is a basic step of video data processing, and almost all the processes of video analysis and video processing need video feature extraction first. Three-dimensional convolutional neural networks (CNN) have great advantages in video classification, motion recognition, and other fields because such a technique may better capture the time and spatial feature information in a video. Three-dimensional convolution is the main calculation step in three-dimensional CNN, through which video data may be classified or features may be extracted therefrom. In the related technology, the calculation to the three-dimensional convolution is basically conducted by reducing the dimension, transforming, and mapping three-dimensional data into two-dimensional data or even one-dimensional data for local parallel calculation. However, due to the huge amount of calculation, the calculation runs quite slowly, resulting in the inefficient video data processing.

SUMMARY

It is an object of the present disclosure to provide a video data processing method, system, electronic device, and computer-readable storage medium, whereby the parallel degree of calculation is fully extended, a four-dimensional systolic calculation architecture is constructed by using multiple three-dimensional systolic arrays to perform parallel calculations on the feature value matrix and the weight value matrix, which shortens the calculation time of three-dimensional convolution and improves the video data processing efficiency.

To solve the problem, the present disclosure discloses a video data processing method, including:

acquiring three-dimensional feature data and three-dimensional weight data corresponding to video data;

pre-processing the three-dimensional feature data and the three-dimensional weight data, respectively, to obtain a feature value matrix and a weight value matrix; and inputting the feature value matrix and the weight value matrix into a plurality of three-dimensional systolic arrays for parallel calculations to obtain a video data processing result.

In some embodiments, pre-processing the three-dimensional feature data to obtain a feature value matrix includes:

splitting the three-dimensional feature data according to a convolution kernel size into a plurality of feature data groups, and converting each of the feature data groups into a corresponding two-dimensional matrix according to a preset mapping relationship; and obtaining the feature value matrix from all the two-dimensional matrices.

In some embodiments, pre-processing the three-dimensional weight data to obtain a weight value matrix includes:

rearranging the three-dimensional weight data according to the preset mapping relationship to obtain the weight value matrix.

In some embodiments, inputting the feature value matrix and the weight value matrix into a plurality of three-dimensional systolic arrays for parallel calculations to obtain a video data processing result includes:

calculating the feature value matrix and the weight value matrix in an i-th input channel according to a corresponding target intermediate value through an i-th three-dimensional systolic array to obtain an i-th calculation result, where $i=1, 2, \ldots, Cin$; and obtaining the video data processing result according to a Cin-th calculation result;

where the target intermediate value is 0 when $i=1$, and the target intermediate value is an $(i-1)$th calculation result when $1<i\leq Cin$.

In some embodiments, calculating the feature value matrix and the weight value matrix in an i-th input channel according to a corresponding target intermediate value through an i-th three-dimensional systolic array to obtain an i-th calculation result includes:

storing Cout weight value matrices corresponding to the feature value matrix in the i-th input channel into Cout calculation units of the i-th three-dimensional systolic array, respectively, wherein Cout is a number of output channels;

sequentially inputting each sub-feature value matrix corresponding to the feature value matrix in the i-th input channel into the i-th three-dimensional systolic array in a first preset cycle;

performing calculation through each of the calculation units according to the target intermediate value, the feature value matrix that is received, and the weight value matrix that is stored, to obtain sub-calculation results corresponding to the calculation units; and obtaining the i-th calculation result based on all the sub-calculation results.

In some embodiments, inputting each sub-feature value matrix corresponding to the feature value matrix in the i-th input channel into the i-th three-dimensional systolic array includes:

inputting q feature values of an r-th row of each sub-feature value matrix corresponding to the feature value matrix in the i-th input channel into q processing elements of an r-th row of the Cout calculation units of the i-th three-dimensional systolic array in a second preset cycle, where a size of the sub-feature value matrix is p×q, p and q are both positive integers, and $r=1, 2, \ldots, p-1$;

wherein a time interval between inputting q feature values in an $(r+1)$th row of the sub-feature value matrix to a j-th calculation unit and inputting q feature values in the r-th row of the sub-feature value matrix to the j-th calculation unit is the second preset cycle, where $j=1, 2, \ldots, Cout$.

In some embodiments, performing calculation through each of the calculation units according to the target intermediate value, the feature value matrix that is received, and the weight value matrix that is stored to obtain sub-calculation results corresponding to the calculation units includes:

performing calculation according to a first relational equation through q processing elements of the r-th row of each of the calculation units to obtain a calculation result of each processing element;

wherein the first relational equation is $h_{rw}=t_{rw}\times q_{rw}+c_{rw}$, where $h_{rw}$ is a calculation result of an w-th processing element in the r-th row, $t_{rw}$ is the feature value received by the w-th processing element in the r-th row, $q_{rw}$ is the weight value of the w-th processing element in the r-th row, $c_{rw}$ is the target intermediate value corresponding to the w-th processing element in the r-th row, and w=1, 2, . . . , q; and obtaining the sub-calculation results of the calculation units from a sum of the calculation results of all the processing elements in a same column.

In some embodiments, obtaining the video data processing result according to a Cin-th calculation result includes:

acquiring output results of all the calculation units in the Cin-th three-dimensional systolic array; and obtaining the video data processing result according to output results output from the Cout calculation units.

In some embodiments, acquiring output results of all the calculation units in the Cin-th three-dimensional systolic array includes:

acquiring the output results of all the calculation units in the Cin-th three-dimensional systolic array through a second relational equation, wherein the second relational equation is $$H = \sum_{w=1}^{q}\left(\sum_{r=1}^{p} h_{rw}\right).$$

To solve the problem above, the present disclosure further discloses a video data processing system, including:

an acquisition module configured to acquire three-dimensional feature data and three-dimensional weight data corresponding to the video data;

a pre-processing module configured to pre-process the three-dimensional feature data and the three-dimensional weight data, respectively, to obtain a feature value matrix and a weight value matrix; and a calculation module configured to input the feature value matrix and the weight value matrix into a plurality of three-dimensional systolic arrays for parallel calculations to obtain a video data processing result.

To solve the problem above, the present disclosure further discloses an electronic device, including:

a memory configured to store a computer program; and a processor configured to execute the computer program to implement steps of the video data processing method according to any one of claims 1 to 9.

To solve the problem above, the present disclosure further discloses a computer-readable storage medium having stored therein a computer program which, when executed by a processor, implements steps of the video data processing method according to any one of claims 1 to 9.

According to the video data processing method provided in the present disclosure, the three-dimensional feature value and three-dimensional weight value of the video data are pre-processed by reducing their dimension and then raising their dimension, and the parallel degree of calculation is fully extended under a feasible condition; a four-dimensional systolic calculation architecture is constructed by using multiple three-dimensional systolic arrays to perform parallel calculations on the feature value matrix and the weight value matrix, which shortens the calculation time of three-dimensional convolution and improves the video data processing efficiency. Further, a three-dimensional convolution parallel calculations system, an electronic device, and a computer-readable storage medium are provided herein, and they have the same advantageous effects as the above-mentioned three-dimensional convolution parallel calculations method.

BRIEF DESCRIPTION OF THE DRAWINGS

The accompanying drawings as used in the description of embodiments of the present disclosure or related art will be briefly introduced below so as to clearly illustrate solutions of the embodiments of the present disclosure. It is apparent that the accompanying drawings in the following description illustrate merely some embodiments of the present disclosure, and those skilled in the art may obtain other accompanying drawings based on these accompanying drawings without paying any creative efforts. In the figures:

FIG. 1 is a flowchart of a video data processing method provided in some embodiments of the present disclosure;

DETAILED DESCRIPTION OF THE EMBODIMENTS

Figures 2, 3:
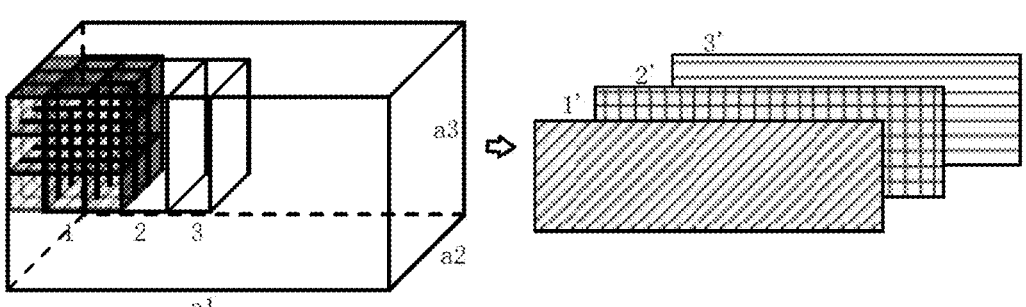
FIG. 2 is a schematic diagram of a mapping relationship provided in some embodiments of the present disclosure.
FIG. 3 is a schematic diagram of a rearrangement of three-dimensional feature values provided in some embodiments of the present disclosure.

The core concept of the present disclosure is to provide a video data processing method, system, electronic device, and computer-readable storage medium, whereby the parallel degree of calculation is fully extended, and a four-dimensional systolic calculation architecture is constructed by using multiple three-dimensional systolic arrays to perform parallel calculations on the feature value matrix and the weight value matrix, which shortens the calculation time of three-dimensional convolution and improves the video data processing efficiency.

In order that the object, aspects, and advantages of the embodiments of the present disclosure become more apparent, a more complete description of the embodiments of the present disclosure will be rendered by reference to the appended drawings, which are provided for purposes of illustration and are not intended to be exhaustive or limiting of the present disclosure. Based on embodiments herein, all the other embodiments obtained by a person of ordinary skill in the art without involving any inventive effort shall fall within the scope of the present disclosure.

To facilitate the understanding of the video data processing method based on three-dimensional convolution provided in the present disclosure, structural parameters of a convolution layer are described below, and the structural parameters of the convolution layer are mainly as follows.

Kernel size: defining a receptive field of convolution, it is typically set as 3 in a three-dimensional convolution, that is, the kernel size is 3×3×3.

Stride: defining a step length when a convolution kernel traverses images, it is usually set as 1; the images may be downsampled when the stride is set as 2, which is similar to the maximum pooling.

Padding: defining how the network layer handles sample boundaries. When the kernel size is greater than 1 and no padding is performed, the output size will be reduced accordingly. When the convolution kernel performs padding in a standard way, the spatial size of the output data will be equal to the input.

It is assumed that the size of input data is a1×a2×a3, the number of input channels is Cin, the kernel size is f, namely, a convolution kernel contains f×f×f weight values, the number of output channels is Cout, and the total number of weight values is f×f×f×Cin×Cout.

Given the above, a final output size of the three-dimensional convolution is $$\left(\frac{a1 - f + 2 \times padding}{Stride} + 1\right) \times$$
$$\left(\frac{a2 - f + 2 \times padding}{Stride} + 1\right) \times \left(\frac{a3 - f + 2 \times padding}{Stride} + 1\right) \times Cout,$$

and this formula is still valid for one-dimensional and two-dimensional convolutions, as long as the dimensions of the input data are adjusted.

The video data processing method provided in some embodiments of the present disclosure is described in detail below.

With reference to FIG. 1, a flowchart of a video data processing method provided in some embodiments of the present disclosure, the video data processing method includes the following steps.

Step S101, acquiring three-dimensional feature data and three-dimensional weight data corresponding to video data.

Firstly, it is to be noted that the input data of the three-dimensional convolution is composed of Cin three-dimensional feature value matrices and a number of (Cin× Cout) three-dimensional weight value matrices, where the size of a single three-dimensional feature value matrix is a1×a2×a3, and the size of a single three-dimensional weight value matrix is f×f×f. Therefore, in the video data processing method based on the three-dimensional convolution provided in this embodiment, it is needed to acquire the input data of the three-dimensional convolution (i.e., the three-dimensional feature data and the three-dimensional weight data corresponding to the video data) in advance so as to perform a convolution operation on the video data subsequently. The video data in this embodiment may be taken from a security monitor or collected during an automatic driving process, and may also be the video data of a streaming media on-line video. The application of the video data is not specifically defined in the present disclosure.

In this step, the three-dimensional feature data and the three-dimensional weight data corresponding to the video data may be acquired in a preset obtaining cycle, and the three-dimensional feature data and the three-dimensional weight data corresponding to the video data may also be acquired after an acquisition instruction is received. This embodiment herein does not define the triggering condition for acquiring the three-dimensional feature data and the three-dimensional weight data corresponding to the video data.

S102, pre-processing the three-dimensional feature data and the three-dimensional weight data, respectively, to obtain a feature value matrix and a weight value matrix.

In some embodiments, after the three-dimensional feature data and the three-dimensional weight data are obtained, the three-dimensional feature data and the three-dimensional weight data are subjected to dimension reduction, so as to satisfy the requirements of the scale and time sequence of the three-dimensional systolic array. In an embodiment, a process of pre-processing the three-dimensional feature data to obtain a feature value matrix includes: splitting the three-dimensional feature data according to a convolution kernel size into a plurality of feature data groups, and converting each of the feature data groups into a corresponding two-dimensional matrix according to a preset mapping relationship; and obtaining the feature value matrix according to all the two-dimensional matrices; in an embodiment, a process of pre-processing the three-dimensional weight data to obtain a weight value matrix includes: rearranging the three-dimensional weight data according to the preset mapping relationship to obtain the weight value matrix.

In some embodiments, with reference to FIG. 3, the three-dimensional feature data is split according to the kernel size into a three-dimensional feature value matrix 1, a three-dimensional feature value matrix 2, and a three-dimensional feature value matrix 3; the three-dimensional feature value matrix 1 is processed into a two-dimensional matrix 1' according to a mapping relationship as shown in FIG. 2; the three-dimensional feature value matrix 2 is processed into a two-dimensional matrix 2' according to a mapping relationship as shown in FIG. 2; the three-dimensional feature value matrix 3 is processed into a two-dimensional matrix 3' according to a mapping relationship as shown in FIG. 2; the two-dimensional matrix 1', the two-dimensional matrix 2', and the two-dimensional matrix 3' are combined into a new feature value matrix in a traverse order of a1, a2, and a3. Herein, FIG. 2 is a mapping relationship determined according to the manner of data cycling with f=3 as an example, which may be conveniently implemented in a hardware circuit.

Figure 4:
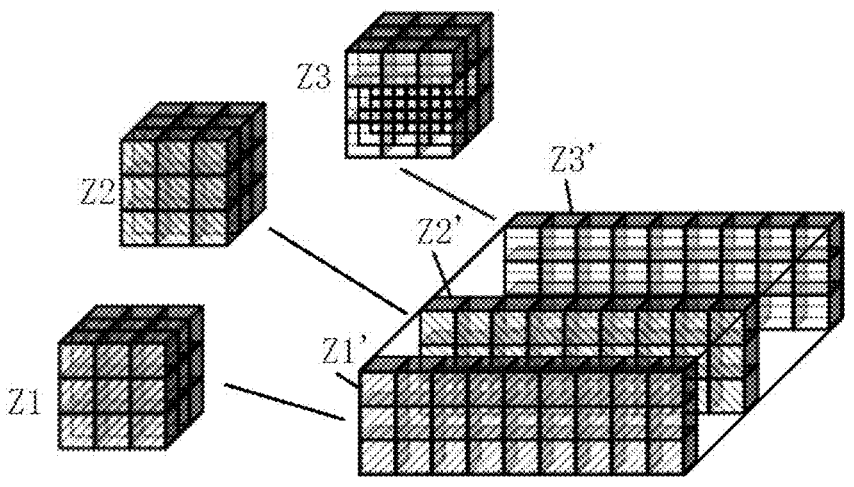
FIG. 4 is a schematic diagram of a rearrangement of three-dimensional weight values provided in some embodiments of the present disclosure.

In some embodiments with regard to the pre-processing of the three-dimensional weight values required for the three-dimensional convolution calculation, reference may be made to FIG. 4, where Cout convolution kernels corresponding to one input channel are respectively expanded according to the corresponding relationship shown in FIG. 2 and are integrated into a new weight value matrix; according to the mapping relationship shown in FIG. 2, the three-dimensional weight value matrix Z1 is processed into a two-dimensional matrix Z1', according to the mapping relationship shown in FIG. 2, the three-dimensional weight value matrix Z2 is processed into a two-dimensional matrix Z2', and according to the mapping relationship shown in FIG. 2, the three-dimensional weight value matrix Z3 is processed into a two-dimensional matrix Z3'; a new weight value matrix is obtained according to the two-dimensional matrix Z1', the two-dimensional matrix Z2', and the two-dimensional matrix Z3'.

In some embodiments, taking f=3 as an example, firstly, a first group of 3×3×3 feature data is selected from the three-dimensional feature data in a first input channel as a first feature data group and reordered according to the mapping relationship shown in FIG. 2 to obtain a two-dimensional matrix corresponding to the first feature data group, which herein are 27 pieces of feature data, i.e., t1-1-1, t1-1-2, t1-1-9, t1-2-1, t1-2-2, t1-2-9, t1-3-1, t1-3-2, t1-3-9, where t1-1-1, t1-1-2, . . . , t1-1-9 represent nine numerical values in a first row, t1-2-1, t1-2-2, . . . , t1-2-9 represent nine numerical values in a second row, t1-3-1, t1-3-2, . . . , t1-3-9 represent nine numerical values in a third row; similarly, a second group of 3×3×3 feature data may be selected from the three-dimensional feature data in the first input channel as a second feature data group and reordered according to the mapping relationship shown in FIG. 2 to obtain a two-dimensional matrix corresponding to the second feature data group, and the rest is based on the same reasoning. The three-dimensional weight data corresponding to the first input channel also needs to be reordered according to the mapping relationship shown in FIG. 2 to obtain a plurality of weight value matrices, and the feature value matrix and the weight value matrix use the same data structure, so as to perform parallel calculations subsequently and improve the parallel operation efficiency.

In step S103, the feature value matrix and the weight value matrix are input into a plurality of three-dimensional systolic arrays for parallel calculations to obtain a video data processing result.

In some embodiments, the three-dimensional feature data and the three-dimensional weight data of the video data, after being pre-processed as described in S102, are input into a four-dimensional systolic calculation architecture constructed by using multiple three-dimensional systolic arrays to perform parallel calculations on the feature value matrix and the weight value matrix, so as to obtain a three-dimensional convolution calculation result, and the three-dimensional convolution calculation result is taken as the video data processing result, which may be a classification result, a feature extraction result, etc. By extending a parallel degree of three-dimensional convolution calculation, the calculation efficiency is improved, especially for video processing with high real-time requirements, enabling support for diversified AI processing of real-time three-dimensional images.

It may be seen that in the present embodiment, the three-dimensional feature value and three-dimensional weight value of the video data are pre-processed by reducing their dimension and then raising their dimension, and the parallel degree of calculation is fully extended under feasible conditions; a four-dimensional systolic calculation architecture is constructed by using multiple three-dimensional systolic arrays to perform parallel calculations on the feature value matrix and the weight value matrix, which shortens the calculation time of three-dimensional convolution and improves the video data processing efficiency.

Based on the above embodiments, in some embodiments, a process of inputting the feature value matrix and the weight value matrix into a plurality of three-dimensional systolic arrays for parallel calculations to obtain a video data processing result includes:

calculating the feature value matrix and the weight value matrix in an i-th input channel according to a corresponding target intermediate value through an i-th three-dimensional systolic array to obtain an i-th calculation result, where i=1, 2, . . . , Cin; and obtaining the video data processing result according to a Cin-th calculation result;

where the target intermediate value is 0 when i=1, and the target intermediate value is an (i−1)th calculation result when 1<i≤Cin.

Figure 5:
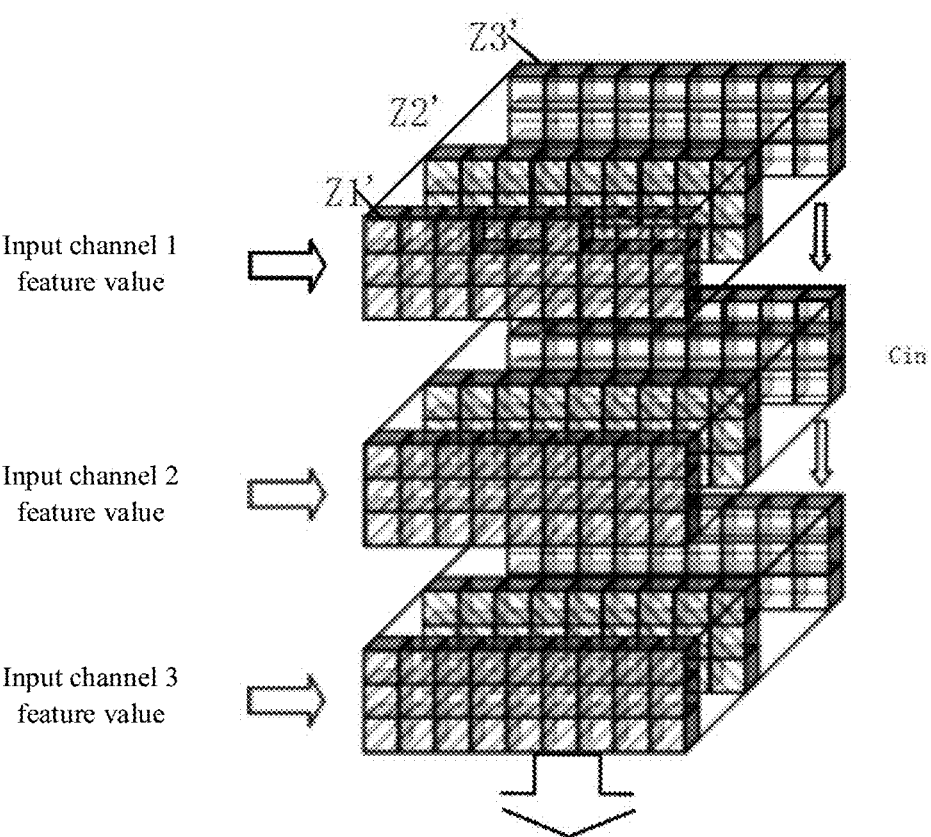
FIG. 5 is a schematic diagram showing an architecture of a four-dimensional systolic array provided in some embodiments of the present disclosure.

It may be understood that one input channel corresponds to one three-dimensional systolic array, and in this embodiment, with reference to FIG. 5, there are a plurality of three-dimensional systolic arrays, wherein each three-dimensional systolic array is used for implementing the convolution calculation of the three-dimensional data in the input channel corresponding thereto, and a four-dimensional parallel operation architecture may be constructed by a plurality of three-dimensional systolic arrays. In a convolution calculation, the intermediate value, the weight value, and the feature value are needed, and the feature value and the intermediate value may be pulse-propagated in a specific direction by using the solution of this embodiment; with reference to FIG. 6, a solid arrow Y represents the propagation direction of the feature value, a dotted arrow V represents the propagation direction of the intermediate value, and thus a stereo networked pipeline operation comes into being.

It may be understood that the target intermediate value corresponding to the first three-dimensional systolic array is 0, the target intermediate value corresponding to the second three-dimensional systolic array is the calculation result of the first three-dimensional systolic array, and the target intermediate value corresponding to the third three-dimensional systolic array is the calculation result of the second three-dimensional systolic array; by the same reasoning, the calculation result of the last three-dimensional systolic array (i.e., the Cin-th three-dimensional systolic array) is obtained, and the video data processing result is obtained according to this calculation result.

In an embodiment, a process of calculating the feature value matrix and the weight value matrix in an i-th input channel according to a corresponding target intermediate value through an i-th three-dimensional systolic array to obtain an i-th calculation result includes:

storing Cout weight value matrices corresponding to the feature value matrix in the i-th input channel into Cout calculation units of the i-th three-dimensional systolic array, respectively, wherein Cout is a number of output channels;

inputting each sub-feature value matrix corresponding to the feature value matrix in the i-th input channel sequentially into the i-th three-dimensional systolic array in a first preset cycle;

performing calculation through each of the calculation units according to the target intermediate value, the feature value matrix that is received, and the weight value matrix that is stored to obtain sub-calculation results corresponding to the calculation units; and obtaining the i-th calculation result based on all the sub-calculation results.

In some embodiments, assuming f=3, and taking the feature value matrix and weight value matrix corresponding to the first input channel as an example, the calculation operation performed by the three-dimensional systolic array is described, and the situations corresponding to other input channels are based on the same reasoning. The first three-dimensional weight data matrix corresponding to the first input channel is reordered according to the arrangement relationship shown in FIG. 2 and is pre-stored into a leftward diagonal stripe region (a first calculation unit) of the three-dimensional systolic array shown in FIG. 4, and herein assumption is made that there are 27 pieces of weight data, i.e., q1-1-1, q1-1-2, q1-1-9, q1-2-1, q1-2-2, q1-2-9, q1-3-1, q1-3-2, . . . , q1-3-9. The second three-dimensional weight data matrix corresponding to the first input channel is reordered according to the arrangement relationship shown in FIG. 2 and is pre-stored into a rightward diagonal stripe region (a second calculation unit) of the three-dimensional systolic array shown in FIG. 4; and the Cout-th three-dimensional weight data matrix corresponding to the first input channel is reordered according to the arrangement relationship shown in FIG. 2 and is pre-stored into a transverse stripe region (a Cout-th calculation unit) of the three-dimensional systolic array shown in FIG. 4. The same applies to the processing of the three-dimensional data corresponding to the other input channels. It may be understood that all the three-dimensional weight data is pre-processed and then pre-stored in the three-dimensional systolic array, and does not change during the parallel calculation.

In some embodiments, a plurality of sub-feature value matrices may be obtained according to the feature value matrix in each input channel, where the size of each sub-feature value matrix is p×q, and all the sub-feature value matrices are input into the three-dimensional systolic array in the first preset cycle; if the feature value matrix in the input channel includes three sub-feature value matrices, then a first sub-feature value matrix is input into the three-dimensional systolic array in a $1^{st}$ first preset cycle, a second sub-feature value matrix is input into the three-dimensional systolic array in a $2^{nd}$ first preset cycle, and a third sub-feature value matrix is input to the three-dimensional systolic array in a $3^{rd}$ first preset cycle.

Furthermore, the feature value matrices in different input channels may be input into respective corresponding three-dimensional systolic arrays at an interval of the preset cycle, and the processing of the feature value matrix in each input channel is as described above.

Each of the calculation units performs calculation according to the target intermediate value, the feature value matrix that is received, and the weight value matrix that is stored, to obtain sub-calculation results corresponding to the calculation units; the sub-calculation results of all the calculation units in the three-dimensional systolic array constitute the calculation result of the three-dimensional systolic array.

In some embodiments, a process of inputting each sub-feature value matrix corresponding to the feature value matrix in the i-th input channel into the i-th three-dimensional systolic array includes:

inputting q feature values of an r-th row of each sub-feature value matrix corresponding to the feature value matrix in the i-th input channel into q processing elements of an r-th row of the Cout calculation units of the i-th three-dimensional systolic array in a second preset cycle, where a size of the sub-feature value matrix is p×q, p and q are both positive integers, and r=1, 2, . . . , p−1;

wherein a time interval between inputting q feature values in an (r+1)th row of the sub-feature value matrix to a j-th calculation unit and inputting q feature values in the r-th row of the sub-feature value matrix to the j-th calculation unit is the second preset cycle, where j=1, 2, . . . , Cout.

In some embodiments, in this embodiment, the process of inputting each sub-feature value matrix into the three-dimensional systolic array is defined, and assuming f=3, it may be understood that after the above-mentioned pre-processing described in S102, each calculation unit in the three-dimensional systolic array includes 3×9 processing elements (PEs), and each PE will perform data transmission with an adjacent PE according to predetermined steps.

Taking an input process of one of the sub-feature value matrices as an example, the description is as follows. The size of the sub-feature value matrix is p×q; in this embodiment, p=3 and q=9; as shown with reference to FIG. 4, in a $1^{st}$ second preset cycle, nine pieces of feature data in the first row of the sub-feature value matrix are input into 9 PEs in the first row of the first calculation unit in a one-to-one correspondence manner; in a $2^{nd}$ second preset cycle, nine pieces of feature data in the first row of the sub-feature value matrix are input into 9 PEs in the first row of the second calculation unit in a one-to-one correspondence manner; and in a $3^{rd}$ second preset cycle, nine pieces of feature data in the first row of the sub-feature matrix are input into 9 PEs in the first row of the third calculation unit in one-to-one correspondence, and so on. Furthermore, to improve the parallel degree of calculation, in the $2^{nd}$ second preset cycle, while inputting the nine pieces of feature data in the first row of the sub-feature value matrix into the 9 PEs in the first row of the second calculation unit in one-to-one correspondence, nine pieces of feature data in a second row of the sub-feature value matrix are input into 9 PEs in the second row of the first calculation unit in one-to-one correspondence.

In an embodiment, a process of performing calculation according to the target intermediate value, the feature value matrix that is received, and the weight value matrix that is stored by each of the calculation units to obtain sub-calculation results corresponding to the calculation units includes:

calculating according to a first relational equation through q processing elements of the r-th row of each of the calculation units to obtain a calculation result of each processing element;

wherein the first relational equation is $h_{rw}=t_{rw}\times q_{rw}+c_{rw}$, where $h_{rw}$ is a calculation result of a w-th processing element in the r-th row, $t_{rw}$ is the feature value received by the w-th processing element in the r-th row, q, is the weight value of the w-th processing element in the r-th row, c, is the target intermediate value corresponding to the w-th processing element in the r-th row, and w=1, 2, . . . , q; and obtaining the sub-calculation results of the calculation units from a sum of the calculation results of all the processing elements in a same column.

In an embodiment, a process of obtaining the video data processing result according to a Cin-th calculation result includes:

acquiring output results of all the calculation units in the Cin-th three-dimensional systolic array; and obtaining the video data processing result according to results output from the Cout calculation units.

In an embodiment, a process of acquiring output results of all the calculation units in the Cin-th three-dimensional systolic array includes:

acquiring the output results of all the calculation units in the Cin-th three-dimensional systolic array through a second relational equation, wherein the second relational equation is $$H = \sum_{w=1}^{q}\left(\sum_{r=1}^{p} h_{rw}\right).$$

In some embodiments, the process of calculating the three-dimensional systolic array is described as follows.

Firstly, a first sub-feature value matrix is selected from the feature value matrix of the first input channel, including twenty-seven pieces of feature data, i.e., t1-1-1, t1-1-2, . . . , t1-1-9, t1-2-1, t1-2-2, . . . , t1-2-9, t1-3-1, t1-3-2, . . . , t1-3-9; a second sub-feature value matrix is selected from the feature value matrix of the first input channel, including twenty-seven pieces of feature data, i.e., t2-1-1, t2-1-2, . . . , t2-1-9, t2-2-1, t2-2-2, . . . , t2-2-9, t2-3-1, t2-3-2, . . . , t2- 3-9; a third sub-feature value matrix is selected from the feature value matrix of the first input channel, including twenty-seven pieces of feature data, i.e., t3-1-1, t3-1-2, . . . , t3-1-9, t3-2-1, t3-2-2, . . . , t3-2-9, t3-3-1, t3-3-2, . . . , t3-3-9; a fourth sub-feature value matrix is selected from the feature value matrix of the first input channel, including t4-1-1, t4-1-2, . . . , t4-1-9, t4-2-1; t4-2-2, . . . , t4-2-9, t4-3-1, t4-3-2, . . . , t4-3-9. By the same reasoning, a first sub-feature value matrix is selected from the feature value matrix of the second input channel, including twenty-seven pieces of feature data, i.e., t'1-1-1, t'1-1-2, . . . , t'1-1-9, t'1-2-1, t'1-2-2, . . . , t'1-2-9, t'1-3-1, t'1-3-2, . . . , t'1-3-9.

In the first preset cycle, the feature data t1-1-1, t1-1-2, . . . , t1-1-9 are sent to nine PEs in the top row of the leftward diagonal stripe region shown in FIG. 4, and are respectively multiplied by weight values q1-1-1, q1-1-2, . . . , q1-1-9 respectively, that is, t1-1-1 is multiplied by q1-1-1, t1-1-2 is multiplied by q1-1-2, and so on; respectively, the resultant intermediate values are set as m1-1-1, m1-1-2, . . . , m1-1-9, to be the target intermediate value of all the PEs in the next row, respectively.

In the second preset cycle, the feature data t1-2-1, t1-2-2, . . . , t1-2-9 are sent to nine PEs in the middle row of the leftward diagonal stripe region shown in FIG. 4, multiplied by weight values q1-2-1, q1-2-2, . . . , q1-2-9 respectively, and are added to the input intermediate values m1-1-1, m1-1-2, . . . , m1-1-9, that is, t1-2-1 is multiplied by q1-2-1 and added to m1-1-1, t1-2-2 is multiplied by q1-2-2 and added to m1-1-2, and so on; the resulting intermediate values are set as m1-2-1, m1-2-2, . . . , m1-2-9. Moreover, t2-1-1, t2-1-2, . . . , t2-1-9 of the feature data are sent to nine PEs in the top row of the leftward diagonal stripe region shown in FIG. 4 and multiplied by q1-1-1, q1-1-2, . . . , q1-1-9 respectively, that is, t2-1-1 is multiplied by q1-1-1, t2-1-2 is multiplied by q1-1-2, and so on, and the resulting intermediate values are set as m2-1-1, m2-1-2, . . . , m2-1-9. Moreover, the feature data t1-1-1, t1-1-2, t1-1-9 are sent to nine PEs in the top row of the rightward diagonal stripe region shown in FIG. 4 and multiplied by q2-1-1, q2-1-2, q2-1-9 respectively, that is, t1-1-1 is multiplied by q2-1-1, t1-1-2 is multiplied by q2-1-2, and so on, and the resulting intermediate values are set as n1-1-1, n1-1-2, . . . , n1-1-9.

In a third preset cycle, the feature data t1-3-1, t1-3-2, . . . , t1-3-9 are sent to nine PEs in the bottom row of the leftward diagonal stripe region shown in FIG. 4, multiplied by q1-3-1, q1-3-2, . . . , q1-3-9 respectively, and added to the input intermediate values m1-2-1, m1-2-2, . . . , m1-2-9, that is, t1-3-1 is multiplied by q1-3-1 and added to m1-2-1, t1-3-2 is multiplied by q1-3-2 are added to m1-2-2, and so on; the resulting intermediate values are set as m1-3-1, m1-3-2, . . . , m1-3-9. Moreover, the feature data t2-2-1, t2-2-2, . . . , t2-2-9 are sent to nine PEs in the middle row of the leftward diagonal stripe region shown in FIG. 4, respectively multiplied by q1-2-1, q1-2-2, . . . , q1-2-9, and added to the input intermediate values m2-1-1, m2-1-2, . . . , m2-1-9, that is, t2-2-1 is multiplied by q1-2-1 and added to m2-1-1, t2-2-2 is multiplied by q1-2-2 and added to m2-1-2, and so on; the resulting intermediate values are set as m2-2-1, m2-2-2, . . . , m2-2-9. Moreover, the feature data t3-1-1, t3-1-2, . . . , t3-1-9 are sent to nine PEs in the top row of the leftward diagonal stripe region shown in FIG. 4 and respectively multiplied by q1-1-1, q1-1-2, . . . , q1-1-9, that is, t3-1-1 is multiplied by q1-1-1, t3-1-2 is multiplied by q1-1-2, and so on, and the resulting intermediate values are set as m3-1-1, m3-1-2, . . . , m3-1-9. Moreover, the feature data t1-2-1, t1-2-2, . . . , t1-2-9 are sent to nine PEs in the middle row of the rightward diagonal stripe region shown in FIG. 4, respectively multiplied by q2-2-1, q2-2-2, . . . , q2-2-9, and added to the input intermediate values n1-1-1, n1-1-2, . . . , n1-1-9, that is, t1-2-1 is multiplied by q2-2-1 and added to n1-1-1, t1-2-2 is multiplied by q2-2-2 and added to n1-1-2, and so on, and the resulting intermediate values are set as n1-2-1, n1-2-2, . . . , n1-2-9. Moreover, the feature data t2-1-1, t2-1-2, . . . , t2-1-9 are sent to the nine PEs in the top row of the rightward diagonal stripe region shown in FIG. 4 and respectively multiplied by q2-1-1, q2-1-2, . . . , q2-1-9, that is, t2-1-1 is multiplied by q2-1-1, t2-1-2 is multiplied by q2-1-2, and so on, and the resulting intermediate values are set as n2-1-1, n2-1-2, . . . , n2-1-9. Moreover, the feature data t1-1-1, t1-1-2, . . . , t1-1-9 are sent to the nine PEs in the top row of a group (not shown in FIG. 4 for a concisely showing effect) behind the rightward diagonal stripe region shown in FIG. 4 and respectively multiplied by q3-1-1, q3-1-2, . . . , q3-1-9, that is, t1-1-1 is multiplied by q3-1-1, t1-1-2 is multiplied by q3-1-2, and so on, and the resulting intermediate values are set as o1-1-1, o1-1-2, . . . , o1-1-9.

In a fourth preset cycle, the feature data t1-1-1, t1-1-2, . . . , t1-1-9 are sent to nine PEs in the top row of a second group (not shown in FIG. 4 for a concisely showing effect) behind the rightward diagonal stripe region shown in FIG. 4 and respectively multiplied by q4-1-1, q4-1-2, . . . , q4-1-9, that is, t1-1-1 is multiplied by q4-1-1, t1-1-2 is multiplied by q4-1-2, and so on, and the resulting intermediate values are set as k1-1-1, k1-1-2, . . . , k1-1-9. Moreover, the feature data t1-2-1, t1-2-2, . . . , t1-2-9 are sent to nine PEs in the middle row of a group behind the rightward diagonal stripe region shown in FIG. 4, respectively multiplied by q3-2-1, q3-2-2, . . . , q3-2-9, and added to the input intermediate values o1-1-1, o1-1-2, . . . , o1-1-9, that is, t1-2-1 is multiplied by q3-2-1 and added to o1-1-1, t1-2-2 is multiplied by q3-2-2 and added to o1-1-2, and so on, and the resulting intermediate values are set as o1-2-1 o1-2-2, . . . , o1-2-9. Moreover, the feature data t1-3-1, t1-3-2, . . . , t1-3-9 are sent to the nine PEs in the bottom row of the rightward diagonal stripe region shown in FIG. 4, respectively multiplied by q2-3-1, q2-3-2, . . . , q2-3-9, and added to the input intermediate values n1-2-1, n1-2-2, . . . , n1-2-9, that is, t1-3-1 is multiplied by q1-3-1 and added to m1-2-1, t1-3-2 is multiplied by q1-3-2 and added to m1-2-2, and so on, and the resulting intermediate values are set as m1-3-1, m1-3-2, . . . , m1-3-9. Moreover, the feature data t2-1-1, t2-1-2, . . . , t2-1-9 are sent to nine PEs in the top row of a group (not shown in FIG. 4) behind the rightward diagonal stripe region shown in FIG. 4 and respectively multiplied by q3-1-1, q3-1-2, q3-1-9, that is, t2-1-1 is multiplied by q3-1-1, t2-1-2 is multiplied by q3-1-2, and so on, and the resulting intermediate values are set as o2-1-1, o2-1-2, . . . , o2-1-9. Moreover, the feature data t2-2-1, t2-2-2, . . . , t2-2-9 are sent to nine PEs in the middle row of the rightward diagonal stripe region shown in FIG. 4, respectively multiplied by q2-2-1, q2-2-2, . . . , q2-2-9, and added to the input intermediate values n2-1-1, n2-1-2, . . . , n2-1-9, that is, t2-2-1 is multiplied by q2-2-1 and added to n2-1-1, t2-2-2 is multiplied by q2-2-2 and added to n2-1-2, and so on, and the resulting intermediate values are set as n2-2-1, n2-2-2, . . . , n2-2-9. Moreover, the feature data t2-3-1, t2-3-2, . . . , t2-3-9 are sent to the nine PEs in the bottom row of the leftward diagonal stripe region shown in FIG. 4, respectively multiplied by q1-3-1, q1-3-2, . . . , q1-3-9, and added to the input intermediate values m2-2-1, m2-2-2, . . . , m2-2-9, that is, t2-3-1 is multiplied by q1-3-1 and added to m2-2-1, t2-3-2 is multiplied by q1-3-2 and added to m2-2-2, and so on, and the resulting intermediate values are set as m2-3-1, m2-3-2, . . . , m2-3-9. Moreover, the feature data t3-1-1, t3-1-2, . . . , t3-1-9 are sent to the nine PEs in the top row of the rightward diagonal stripe region shown in FIG. 4 and respectively multiplied by q2-1-1, q2-1-2, . . . , q2-1-9, that is, t3-1-1 is multiplied by q2-1-1, t3-1-2 is multiplied by q2-1-2, and so on, and the resulting intermediate values are set as n3-1-1, n3-1-2, . . . , n3-1-9. Moreover, the feature data t3-2-1, t3-2-2, . . . , t3-2-9 are sent to nine PEs in the middle row of the leftward diagonal stripe region shown in FIG. 4, respectively multiplied by q1-2-1, q1-2-2, . . . , q1-2-9, and added to the input intermediate values m3-1-1, m3-1-2, . . . , m3-1-9, that is, t3-2-1 is multiplied by q1-2-1 and added to m3-1-1, t3-2-2 is multiplied by q1-2-2 and added to m3-1-2, and so on, and the resulting intermediate values are set as m3-2-1. m3-2-2, . . . , m3-2-9. Moreover, the feature data t4-1-1, t4-1-2, . . . , t4-1-9 are sent to nine PEs in the top row of the leftward diagonal stripe region shown in FIG. 4 and respectively multiplied by q1-1-1, q1-1-2, . . . , q1-1-9, that is, t4-1-1 is multiplied by q1-1-1, t4-1-2 is multiplied by q1-1-2, and so on, and the resulting intermediate values are set as m4-1-1, m4-1-2, . . . , m4-1-9. Moreover, the feature data t'1-1-1, t'1-1-2, . . . , t'1-1-9 of the second input channel are sent to nine PEs of the top row of the leftward diagonal stripe region corresponding to the input channel 2 feature values shown in FIG. 5, respectively multiplied by q'1-1-1, q'1-1-2, . . . , q'1-1-9, and added to the input intermediate values m1-3-1, m1-3-2, . . . , m1-3-9, that is, t1-1-1 is multiplied by q'1-1-1 and added to m1-3-1, t'1-1-2 is multiplied by q1-1-2 and added to m1-3-2, and so on, the resulting intermediate values are set as m'1-1-1, m'1-1-2, . . . , m'1-1-9. The calculation steps that follow are basically combinations and repetitions of the above.

Figure 6:
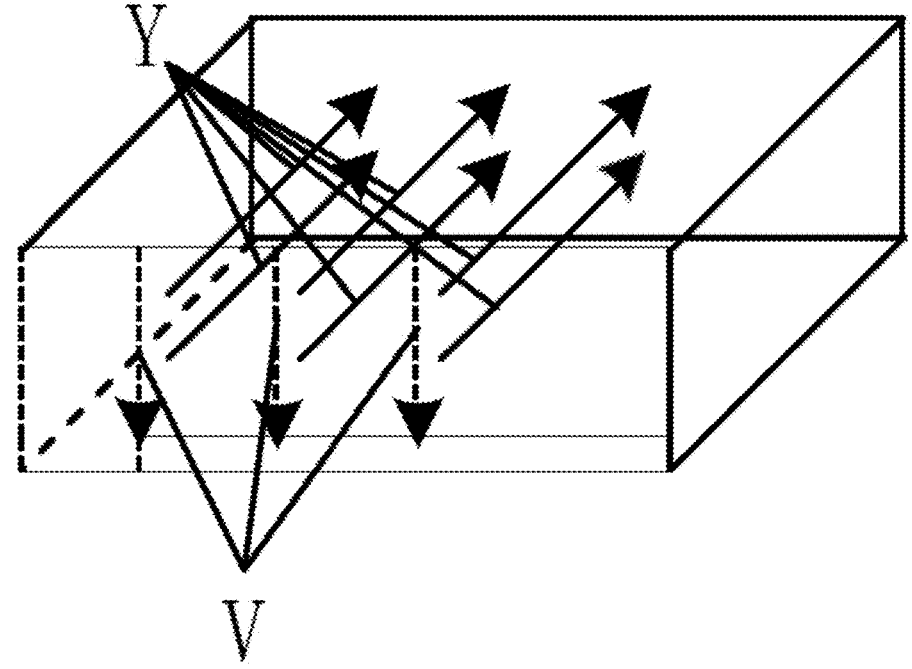
FIG. 6 is a schematic diagram showing data transmission of a three-dimensional systolic array calculation module provided in some embodiments of the present disclosure.

Since the calculation units of all stages are started in batches along the passage of the cycles, the feature data will be transferred horizontally within these calculation units, as indicated by the solid arrow Y in FIG. 6. The intermediate values resulting from the multiplication and addition of all stages are passed through sets of three-dimensional arithmetic arrays, as indicated by the longitudinal dashed arrow V in FIG. 6. When the results of the three-dimensional systolic array of Cin groups are accumulated vertically, it is necessary to additionally accumulate the results of the nine columns in this arrangement into a value, that is, $3 \times 9 \times Cin$ products are added up, and the result is a value in an output channel. The above-mentioned process is repeated until all the calculations are completed.

Furthermore, a full serial calculation is slow because the number of input channels and output channels in deep learning networks is generally quite large, on the order of more than 1000. Here the above three-dimensional calculation array is repeated to achieve multiple parallel calculations. However, the weight values in multiple three-dimensional calculation arrays are different, and the results obtained by these different three-dimensional calculation arrays need to be accumulated again to be the final result.

Figure 7:
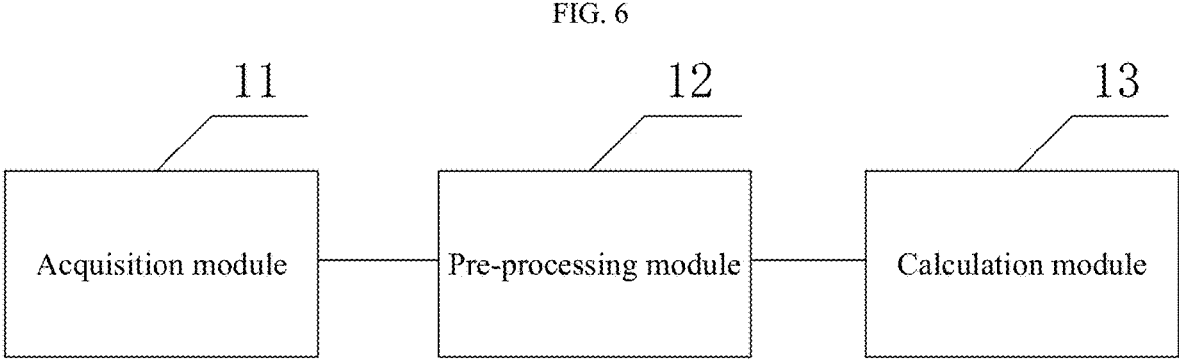
FIG. 7 is a block diagram of a video data processing system provided in some embodiments of the present disclosure.

With reference to FIG. 7, a block diagram of a video data processing system provided in some embodiments of the present disclosure, the video data processing system includes:

an acquisition module 11 for acquiring three-dimensional feature data and three-dimensional weight data corresponding to the video data;

a pre-processing module 12 for pre-processing the three-dimensional feature data and the three-dimensional weight data, respectively, to obtain a feature value matrix and a weight value matrix; and a calculation module 13 for inputting the feature value matrix and the weight value matrix into a plurality of three-dimensional systolic arrays for parallel calculations to obtain a video data processing result.

It may be seen that in this embodiment, the three-dimensional feature value and three-dimensional weight value of the video data are pre-processed by reducing their dimension and then raising their dimension, and the parallel degree of calculation is fully extended under a feasible condition; a four-dimensional systolic calculation architecture is constructed by using multiple three-dimensional systolic arrays to perform parallel calculations on the feature value matrix and the weight value matrix, which shortens the calculation time of three-dimensional convolution and improves the video data processing efficiency.

In an embodiment, the pre-processing module 12 includes:

a first pre-processing unit for splitting the three-dimensional feature data into a plurality of feature data groups according to a convolution kernel size, and converting each of the feature data groups into a corresponding two-dimensional matrix according to a preset mapping relationship; and obtaining the feature value matrix from all the two-dimensional matrices.

In an embodiment, the pre-processing module 12 further includes:

a second pre-processing unit for rearranging the three-dimensional weight data according to the preset mapping relationship to obtain the weight value matrix.

In an embodiment, the calculation module 3 is configured in particular for:

calculating the feature value matrix and the weight value matrix in an i-th input channel according to a corresponding target intermediate value through an i-th three-dimensional systolic array to obtain an i-th calculation result, where $i=1, 2, . . . , Cin$; and obtaining the video data processing result according to a Cin-th calculation result;

where the target intermediate value is 0 when $i=1$, and the target intermediate value is an $(i-1)$th calculation result when $1 < i \leq Cin$.

In an embodiment, a process of calculating the feature value matrix and the weight value matrix in an i-th input channel according to a corresponding target intermediate value through an i-th three-dimensional systolic array to obtain an i-th calculation result includes:

storing Cout weight value matrices corresponding to the feature value matrix in the i-th input channel into Cout calculation units of the i-th three-dimensional systolic array, respectively, wherein Cout is a number of output channels;

inputting each sub-feature value matrix corresponding to the feature value matrix in the i-th input channel sequentially into the i-th three-dimensional systolic array in a first preset cycle;

performing calculation by each of the calculation units according to the target intermediate value, the feature value matrix that is received, and the weight value matrix that is stored, to obtain sub-calculation results corresponding to the calculation units; and

obtaining the i-th calculation result based on all the sub-calculation results.

In an embodiment, a process of inputting each sub-feature value matrix corresponding to the feature value matrix in the i-th input channel into the i-th three-dimensional systolic array includes:

inputting q feature values of an r-th row of each sub-feature value matrix corresponding to the feature value matrix in the i-th input channel into q processing elements of an r-th row of the Cout calculation units of the i-th three-dimensional systolic array in a second preset cycle, where a size of the sub-feature value matrix is p×q, p and q are both positive integers, and r=1, 2, . . . , p–1;

wherein a time interval between inputting q feature values in an (r+1)th row of the sub-feature value matrix to a j-th calculation unit and inputting q feature values in the r-th row of the sub-feature value matrix to the j-th calculation unit is the second preset cycle, where j=1, 2, . . . , Cout.

In an embodiment, a process of performing calculation by each of the calculation units according to the target intermediate value, the feature value matrix that is received, and the weight value matrix that is stored, to obtain sub-calculation results corresponding to the calculation units includes:

performing calculation according to a first relational equation through q processing elements of the r-th row of each of the calculation units to obtain a calculation result of each processing element;

wherein the first relational equation is $h_{rw}=t_{rw}\times q_{rw}+c_{rw}$, where $h_{rw}$ is a calculation result of a w-th processing element in the r-th row, $t_{rw}$ is the feature value received by the w-th processing element in the r-th row, $q_{rw}$ is the weight value of the w-th processing element in the r-th row, $c_{rw}$ is the target intermediate value corresponding to the w-th processing element in the r-th row, and w=1, 2, . . . , q; and obtaining the sub-calculation results of the calculation units from a sum of the calculation results of all the processing elements in a same column.

In an embodiment, a process of obtaining the video data processing result according to a Cin-th calculation result includes:

acquiring output results of all the calculation units in the Cin-th three-dimensional systolic array; and obtaining the video data processing result according to results output from the Cout calculation units.

In an embodiment, a process of acquiring output results of all the calculation units in the Cin-th three-dimensional systolic array includes:

acquiring the output results of all the calculation units in the Cin-th three-dimensional systolic array through a second relational equation, wherein the second relational equation is $$H = \sum_{w=1}^{q}\left(\sum_{r=1}^{p} h_{rw}\right).$$

Figure 8:
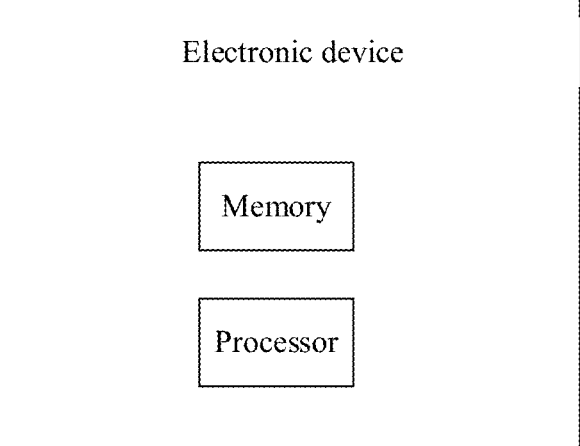
FIG. 8 is a schematic diagram showing an electronic device for video data processing provided in some embodiments of the present disclosure.

In another aspect, the present disclosure also provides an electronic device as shown in FIG. 8, the electronic device including:

a memory for storing a computer program;

a processor for executing the computer program to implement steps of the video data processing method as described in any of the embodiments above.

In the embodiments of the present disclosure, the processor may be a central processing unit (CPU), an application-specific integrated circuit, a digital signal processor, a field-programmable gate array, or other programmable logic devices.

For a description of the electronic device provided in the present disclosure, reference may be made to the above embodiments, and the description will not be detailed in the present disclosure.

The electronic device provided by the present disclosure has the same advantageous effects as the video data processing method described above.

In another aspect, the present disclosure also provides a computer-readable storage medium having stored therein a computer program which, when executed by a processor, performs the steps of the video data processing method as described in any of the embodiments above.

For a description of the computer-readable storage medium provided in the present disclosure, reference may be made to the above embodiments, and the description will not be detailed in the present disclosure.

The computer-readable storage medium provided by the present disclosure has the same advantageous effects as the above-mentioned video data processing method.

It should also be noted that in the present specification, relational terms such as first and second are only used to distinguish an entity or operation from another entity or operation, and it is not necessary for the seeker to imply any such actual relationship or order between these entities or operations. Further, the terms "comprise", "include" or any other variation thereof are intended to cover non-exclusive inclusions, thereby obtaining a process, method, article or apparatus including a series of elements including not only those elements, but also other elements which are not expressly listed, or elements inherent in such process, method, article or equipment. In the absence of further restrictions, the phrase "include a . . . " does not exclude the existence of other identical elements in the process, method, article or apparatus including the element.

The above description of the disclosed embodiments enable those skilled in the art to realize or use the present application. A variety of modifications of these embodiments will be apparent to those skilled in the art, and the general principles defined herein may be implemented in other embodiments without departing from the spirit or scope of the present application. Accordingly, the present application will not be limited to these embodiments shown herein, but will conform to the broadest range consistent with the principles and novel features disclosed herein.

The invention claimed is:

1. A video data processing method, comprising:

acquiring, by a video acquisition device, three-dimensional feature data and three-dimensional weight data corresponding to video data;

pre-processing the three-dimensional feature data and the three-dimensional weight data, respectively, to obtain a feature value matrix and a weight value matrix; and inputting the feature value matrix and the weight value matrix into a plurality of three-dimensional systolic arrays for parallel calculations to obtain a video data processing result; wherein the video data processing result comprises a classification result, a feature extraction result;

wherein inputting the feature value matrix and the weight value matrix into a plurality of three-dimensional systolic arrays for parallel calculations to obtain a video data processing result comprises:

calculating the feature value matrix and the weight value matrix in an i-th input channel according to a corresponding target intermediate value through an i-th three-dimensional systolic array to obtain an i-th calculation result, where i=1, 2, . . . , Cin; and obtaining the video data processing result according to a Cin-th calculation result;

where the target intermediate value is 0 when i=1, and the target intermediate value is an (i−1)th calculation result when 1<i≤Cin;

wherein calculating the feature value matrix and the weight value matrix in an i-th input channel according to a corresponding target intermediate value through an i-th three-dimensional systolic array to obtain an i-th calculation result comprises:

storing Cout weight value matrices corresponding to the feature value matrix in the i-th input channel into Cout calculation units of the i-th three-dimensional systolic array, respectively, wherein Cout is a number of output channels;

sequentially inputting each sub-feature value matrix corresponding to the feature value matrix in the i-th input channel into the i-th three-dimensional systolic array in a first preset cycle;

performing calculation through each of the calculation units according to the target intermediate value, the feature value matrix that is received, and the weight value matrix that is stored, to obtain sub-calculation results corresponding to the calculation units; and obtaining the i-th calculation result based on all the sub-calculation results;

wherein inputting each sub-feature value matrix corresponding to the feature value matrix in the i-th input channel into the i-th three-dimensional systolic array comprises:

inputting q feature values of an r-th row of each sub-feature value matrix corresponding to the feature value matrix in the i-th input channel into q processing elements of an r-th row of the Cout calculation units of the i-th three-dimensional systolic array in a second preset cycle, where a size of the sub-feature value matrix is p×q, p and q are both positive integers, and r=1, 2, . . . , p−1;

wherein a time interval between inputting q feature values in an (r+1)th row of the sub-feature value matrix to a j-th calculation unit and inputting q feature values in the r-th row of the sub-feature value matrix to the j-th calculation unit is the second preset cycle, where j=1, 2, . . . , Cout;

wherein the video data is video data taken from a security monitor or collected during an automatic driving process, or video data of a streaming media on-line video.

2. The video data processing method according to claim 1, wherein pre-processing the three-dimensional feature data to obtain a feature value matrix comprises:

splitting the three-dimensional feature data according to a convolution kernel size into a plurality of feature data groups, and converting each of the feature data groups into a corresponding two-dimensional matrix according to a preset mapping relationship; and obtaining the feature value matrix from all the two-dimensional matrices.

3. The video data processing method according to claim 2, wherein pre-processing the three-dimensional weight data to obtain a weight value matrix comprises:

rearranging the three-dimensional weight data according to the preset mapping relationship to obtain the weight value matrix.

4. The video data processing method according to claim 1, wherein performing calculation through each of the calculation units according to the target intermediate value, the feature value matrix that is received, and the weight value matrix that is stored to obtain sub-calculation results corresponding to the calculation units comprises:

performing calculation according to a first relational equation through q processing elements of the r-th row of each of the calculation units to obtain a calculation result of each processing element;

wherein the first relational equation is $h_{rw}=t_{rw}\times q_{rw}+c_{rw}$, where $h_{rw}$ is a calculation result of a w-th processing element in the r-th row, $t_{rw}$ is the feature value received by the w-th processing element in the r-th row, $q_{rw}$ is the weight value of the w-th processing element in the r-th row, $c_{rw}$ is the target intermediate value corresponding to the w-th processing element in the r-th row, and w=1, 2, . . . , q; and obtaining the sub-calculation results of the calculation units from a sum of the calculation results of all the processing elements in a same column.

5. The video data processing method according to claim 4, wherein obtaining the video data processing result according to a Cin-th calculation result comprises:

acquiring output results of all the calculation units in the Cin-th three-dimensional systolic array; and obtaining the video data processing result according to output results output from the Cout calculation units.

6. The video data processing method according to claim 5, wherein acquiring output results of all the calculation units in the Cin-th three-dimensional systolic array comprises:

acquiring the output results of all the calculation units in the Cin-th three-dimensional systolic array through a second relational equation, wherein the second relational equation is $$H = \sum\nolimits_{w=1}^{q}\left(\sum\nolimits_{r=1}^{p} h_{rw}\right).$$

7. An electronic device, comprising:

a memory configured to store a computer program; and a processor configured to execute the computer program to implement the video data processing method according to claim 1.

8. The electronic device according to claim 7, wherein pre-processing the three-dimensional feature data to obtain a feature value matrix comprises:

splitting the three-dimensional feature data according to a convolution kernel size into a plurality of feature data groups, and converting each of the feature data groups into a corresponding two-dimensional matrix according to a preset mapping relationship; and obtaining the feature value matrix from all the two-dimensional matrices.

9. The electronic device according to claim 8, wherein pre-processing the three-dimensional weight data to obtain a weight value matrix comprises:

rearranging the three-dimensional weight data according to the preset mapping relationship to obtain the weight value matrix.

10. The electronic device according to claim 7, wherein the three-dimensional feature data and the three-dimensional weight data corresponding to the video data are acquired in a preset obtaining cycle or acquired after an acquisition instruction is received.

11. A non-transitory computer-readable storage medium having stored therein a computer program which, when executed by a processor, implements the video data processing method according to claim 1.

12. The non-transitory computer-readable storage medium according to claim 11, wherein pre-processing the three-dimensional feature data to obtain a feature value matrix comprises:

splitting the three-dimensional feature data according to a convolution kernel size into a plurality of feature data groups, and converting each of the feature data groups into a corresponding two-dimensional matrix according to a preset mapping relationship; and obtaining the feature value matrix from all the two-dimensional matrices.

13. The video data processing method according to claim 1, wherein the video data is taken from a security monitor process, or collected during an automatic driving process, or the video data of a streaming media on-line video.

14. The video data processing method according to claim 1, wherein the three-dimensional feature data and the three-dimensional weight data corresponding to the video data are acquired in a preset obtaining cycle or acquired after an acquisition instruction is received.

15. The video data processing method according to claim 1, wherein after the three-dimensional feature data and the three-dimensional weight data are obtained, the three-dimensional feature data and the three-dimensional weight data are subjected to dimension reduction, so as to satisfy the requirements of the scale and time sequence of the three-dimensional systolic array.

16. The video data processing method according to claim 1, wherein the video data processing result is at least one of a classification result and a feature extraction result.

\* \* \* \* \*